(12) United States Patent
Nettleton et al.

(10) Patent No.: US 6,744,801 B2
(45) Date of Patent: Jun. 1, 2004

(54) MONOLITHIC SOLID STATE LASER ASSEMBLY AND METHOD OF MANUFACTURE

(75) Inventors: John E. Nettleton, Fairfax Station, VA (US); Bradley W. Schilling, Fredericksburg, VA (US); Dallas N. Barr, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 102 days.

(21) Appl. No.: 10/107,183

(22) Filed: Mar. 28, 2002

(65) Prior Publication Data

US 2002/0101889 A1 Aug. 1, 2002

Related U.S. Application Data

(63) Continuation of application No. 09/496,281, filed on Feb. 1, 2000, now Pat. No. 6,373,865.

(51) Int. Cl.$^7$ .............................. H01S 3/11; H01S 3/10; H01S 5/00; H01S 3/09; H01S 3/082; H01S 3/08
(52) U.S. Cl. .............................. 372/50; 372/10; 372/27; 372/73; 372/97; 372/106; 372/108
(58) Field of Search .............................. 372/10, 50, 27, 372/73, 97, 106, 108, 19, 25, 30, 99

(56) References Cited

U.S. PATENT DOCUMENTS 6,023,479 A * 2/2000 Thony et al. ................. 372/11
6,259,711 B1 * 7/2001 Laurell ......................... 372/22

* cited by examiner

*Primary Examiner*—Paul Ip
*Assistant Examiner*—Armando Rodriguez
(74) *Attorney, Agent, or Firm*—Arthur K. Samora; William Anderson

(57) ABSTRACT

A one piece laser assembly including a rod of gain medium with one end-face bonded to a broad end-face on a stack of optical wafers that process light differently and mirrors plated on the remaining exposed end-faces of the rod and the stack of wafers.

10 Claims, 2 Drawing Sheets

MONOLITHIC SOLID STATE LASER ASSEMBLY AND METHOD OF MANUFACTURE

RELATED APPLICATION

This application is a Continuation in Part of patent application Ser. No. 09/496,281 filed Feb. 1, 2000, now U.S. Pat. No. 6,373,865 in Art Unit 2877. It is also related to Patent Application (NVL-3211), which is a Continuation in Part of the same parent patent application Ser. No. 09/496,281.

BACKGROUND OF THE INVENTION

1. Field of the Invention

The present invention generally relates to optically pumped, solid-state, q-switched and linearly polarized laser cavity assemblies and, more specifically, to a method of combining these non-pump elements into a single component that can produce pulse energies of 1–1000 millijoules for military and commercial applications.

2. Description of Prior Art

Many military and commercial applications, require high power optical pulses. These, thus, normally employ lasers consisting of a cylindrical cavity assembly closely adjacent an energetic Xenon, pyrotechnic or similar type of flash lamp or diode lsaer that provides the necessary pump power. These pumps can include straight tubes or radiating surfaces as long as the cavity is and parallel to the optical or cylindrical axis, circular surfaces surrounding the cavity or spiral surfaces coaxial with the cavity. The cavity assembly for a high power pulsed laser as used in range-finders, i.e. all laser elements except the optical pump, is typically made up of at least four discrete elements. This application covers a three or more active element structure made into one component plus a base pallet. Applicants' copending cases (NVL-3211) for a PSEUDO-MONOLITHIC Q-SWITCHED LASER WITH LINEAR POLARIZATION and Ser. No. 09/496,281 for a PSEUDO-MONOLITHIC Q-SWITCHED LASER WITH OPTICAL PARAMETRIC OSCILLATOR consist of two and three Components respectively plus a base pallet.

The first cavity element is a rod, many times longer than its diameter of nonconductive crystalline gain material that lases at a characteristic wavelength when exposed to radiation from the pump source. The rod normally has a uniform regular cross-section and a longitudinal optical axis centered in that cross-section. The ends of the rod are ground and polished normal to this axis and are usually coated with anti-reflection coatings to prevent reflection of light rays entering or leaving these ends parallel to this optical axis.

The second element is usually a perfectly flat highly reflective (HR) mirror, at least for the lasing wavelength, mounted precisely normal to the rod axis and spaced slightly from a first end of the rod. Thin film dielectric reflective filters have been used for this mirror to permit end pumping particularly in single mode lasers, but this technique is not as efficient for high power lasers as those mentioned above.

The third element is an output coupler or (OC) mirror which, though also highly reflective, has a specified percent transmission or leakage, at the lasing or output wavelength. This element is mounted similar to the second at the opposite or output end of the rod.

The fourth element is a passive q-switch, or a wafer of material with flat and parallel broad faces normally centered on the optical axis of the rod between the second and third elements. The passive q-switch reduces the Q of the high Q cavity defined by the other three elements, until the inverted population of energy quanta in the rod reaches a critical level. The wafer then automatically restores the high Q to generate a short high power pulse. The rod of gain material is usually a well known laser crystal, such as Neodymium:Yttrium-Aluminum-Garnet (Nd:YAG), ruby, etc. or it could be a glass, such as Erbium Glass (Er:Glass These laser materials absorb at the pump wavelength and fluoresce at lasing wavelengths. Certain types of material, such as Neodymium Vanodate (Nd:YVO$_4$) emit linear polarized laser beams. However, this material is more expensive than Nd(YAG), is softer making it difficult to machine and does not themally match Nd The assembly will lase without the Q-switch, but does not emit sufficient peak power for range finders and similar applications. The q-switch concentrates the output photons in time spaced pulses that have peak powers several orders of magnitude greater than outputs that are not Q-switched. The passive q-switch can be a wafer of impregnated plastic or other materials.

The purpose of using adjustable spaced elements has been to compensate for their imperfect shape and/or placement. The disadvantage of these assemblies lies in the large number of elements required and the need for numerous adjustable support members that permit precise mechanical alignment of the various optical components. This approach makes manufacturing and repair of the assemblies very complicated and expensive.

A goal of the present invention is to reduce the number of parts in the cavity assembly to a single optical element to which may be added a novel base pallet to facilitate mounting to the flash lamp and other equipment associated with the range-finder. Linear polarization is also achieved without using special rod materials and may not even require additional active elements.

SUMMARY OF THE INVENTION

A photon pumped laser cavity assembly including a rod made from laser gain material with precisely polished sides and ends, on one end of which is permanently attached at least one wafer and/or a metallic reflective coating; the one wafer consisting of a Q-switch material with opposite broad surfaces ground precisely flat and parallel. The assembly may also include a second similarly ground wafer of polarizing material or a notch with precisely cut parallel opposed faces oriented at the Brewster angle to polarize the laser beam. The rod may further include a pallet or substrate with faces precisely aligned parallel to the rod's optical axis.

BRIEF DESCRIPTION OF THE DRAWINGS

The foregoing and other objects, aspects and advantages will be better understood from the following detailed description of a preferred embodiment of the invention and with reference to the drawings, in which.

DETAILED DESCRIPTION OF A PREFERRED EMBODIMENT OF THE INVENTION

Figure 1:
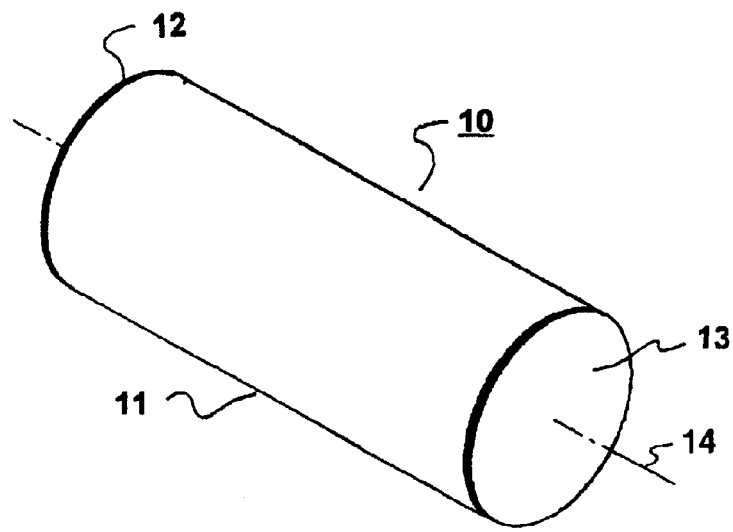
FIG. 1 shows a one-piece three-element laser cavity assembly consisting of a rod having any desired cross-section, e.g. the circular one shown, with precisely ground flat parallel end-faces coated with dielectric or metal mirrors, one highly reflecting and the other designed to leak a small fraction of light incident on it.

As shown in FIG. 1 applicant's monolithic solid-state laser assembly 10 functions like the cavity assembly in any standard light pumped laser, but consists of only one component after fabrication. State of the art manufacturing and fabrication techniques are used to combine the optical elements into a single element with the same functionality. The assembly 10 uses a long rod of laser gain material 11 with an optical axis 14, a first input end-face of which defines the surface of a HR (Highly Reflecting) mirror 12 plated thereon. The remaining second end-face may be coated with only a leaky OC (output coupling) mirror 13. The laser gain material, from which the rod is made, may be ruby, or any of the known laser media. However, Neodymium:Yttrium-Aluminum-Garnet Nd(YAG), which lases at an output wavelength of 1.06 $\mu$m, is preferred. The laser rod, may have any cross-sectional shape, but preferably it is circular or regularly polygonal. A square cross-section may be most desirable, since it provides vertical and horizontal flat surfaces to mate with a flat mounting pallet and align with assembly tools. It is simple to machine and makes efficient use of the boule of laser material. Other shapes and their possible advantages are discussed in the related applications above. The rod is several centimeters long and several millimeters wide. The side faces of the rods are cut very precisely to be flat and parallel within less than thirty, but preferably less than ten seconds of arc. The HR and OC end face of each rod are cut very precisely to be similarly flat and normal to the side faces within the same tolerance.

In a slightly different embodiment, the OC and/or the HR end face of the rod may be cut with a slight convex curvature, within less than 30 seconds of arc, to the surface defined by a sphere several meters in diameter centered on the optical axis. The reflected light behaves essentially as it did when the mirror was flat, but this slight curvature tends to concentrate the lasing rays toward the axis to produce a more intense and better-defined beam. The ends of the rod are then coated with a material that is an excellent reflector for the output wavelength, to form the HR and OC mirrors 12 and 13, respectively.

Figure 2:
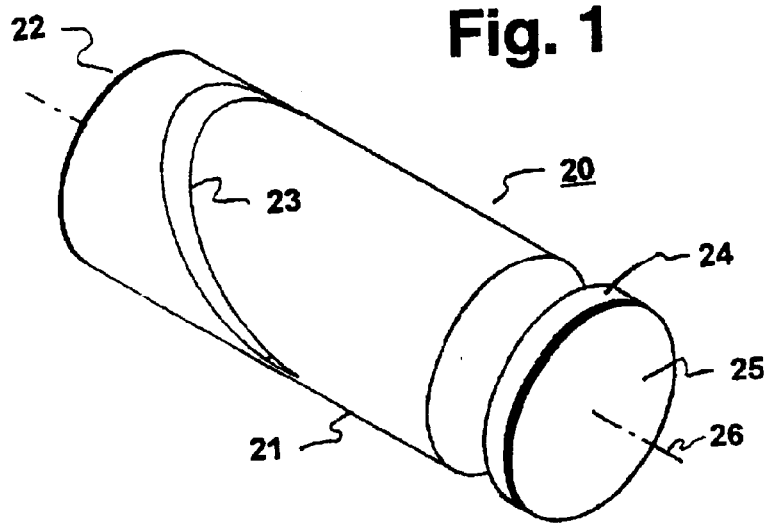
FIG. 2 shows a cavity assembly similar to FIG. 1, but having a rod with a Brewster-notch polarizer plus a precisely ground wafer of Q-switch material bonded to one end of the rod before the one end is plated with one of the mirrors.

FIG. 2 shows another embodiment of an assembly 20 wherein only the HR end-face of the laser rod 21 has a coating, an HR mirror 22. A specialal feature of this assembly is the use of a Brewster Notch polarizer 23, between the ends of the rod. This consists of a slit, e.g. preferably formed by a precision thin flat saw blade, before or after the rods are mounted on the pallet. The notch provides two flat parallel opposed surfaces sloping with the optical axis at the Brewster angle ($\phi$=arctangent $\eta$), where $\eta$ is the index of refraction of the rod. Normally, only about fifteen percent of the unwanted polarization from a randomly polarized beam is removed by a single surface Brewster polarizer, but the repeated reflections in a laser cavity insure that the beam will be nearly 100% linearly polarized. The desired polarization also would normally be refracted at a substantial angle, but the two closely spaced notch surfaces permit only a slight non-angular ray shift. Since the notch does not go all the way across the rod's cross section, the rod remains in one piece and the faces do not require orientation and spacing associated with the similar Brewster Gap polarizer disclosed in applicant's related cases mentioned above.

Another element shown in FIG. 2 is a thin wafer-shaped Q-switch 23, having the same cross section as the rod. The q-switch must also be fabricated such that its surfaces are flat and parallel or spherical and concentric to match the tolerances of the output end of the rod, since the output face of the q-switch defines the reflecting surface of the OC mirror in this design. The OC mirror is plated on the output flat or convex surface of the wafer. The input flat or concave surface of the wafer is bonded to the uncoated end of the rod, before or after adding the OC mirror, using optical matching techniques well known in the art that avoid reflections at such bonded surfaces. The Q-switch material preferred is Cr(4+):YAG that is inherently thermally matched to an Nd:YAG rod.

Figure 3:
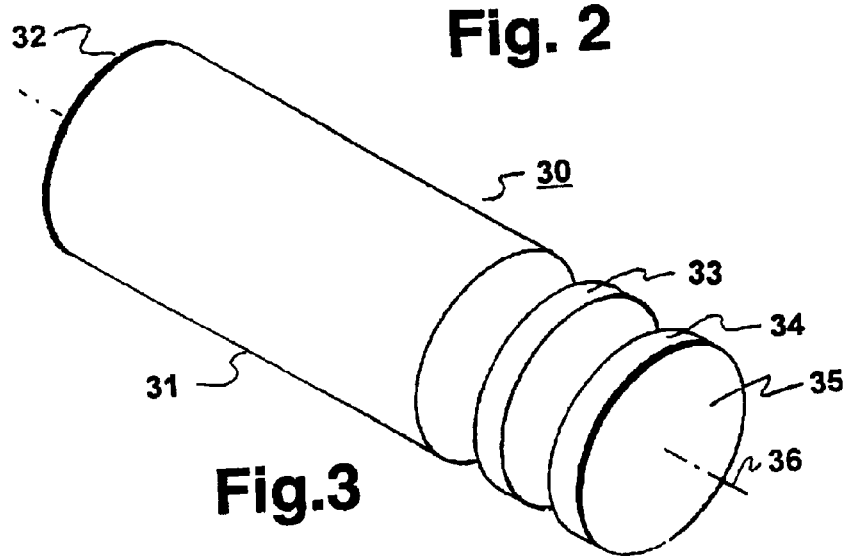
FIG. 3 shows a cavity assembly similar to FIG. 2, but also having a precisely ground wafer of filtering or polarizing material bonded between the Q-switch wafer and one end of the rod.

FIG. 3 shows yet another embodiment of an assembly 30 wherein the rod 31 has an HR mirror 32 on its input end-face and a Q-switch 34 on its output endface. At least one thin flat or curved optical element 33 is then provided with a matching cross-section and bonded between the uncoated end-faces of the rod and Q-switch wafer, before or after adding the OC mirror 35. Examples of element 33 are a polarizing layer, such as "Polaroid" or a thin layer of some dichroic polarizing crystal. Other examples include attenuators or layered dielectric filters. Element 33 must have parallel or concentric end-faces cut to the same tolerances as the end-faces of the rods.

Figure 4:
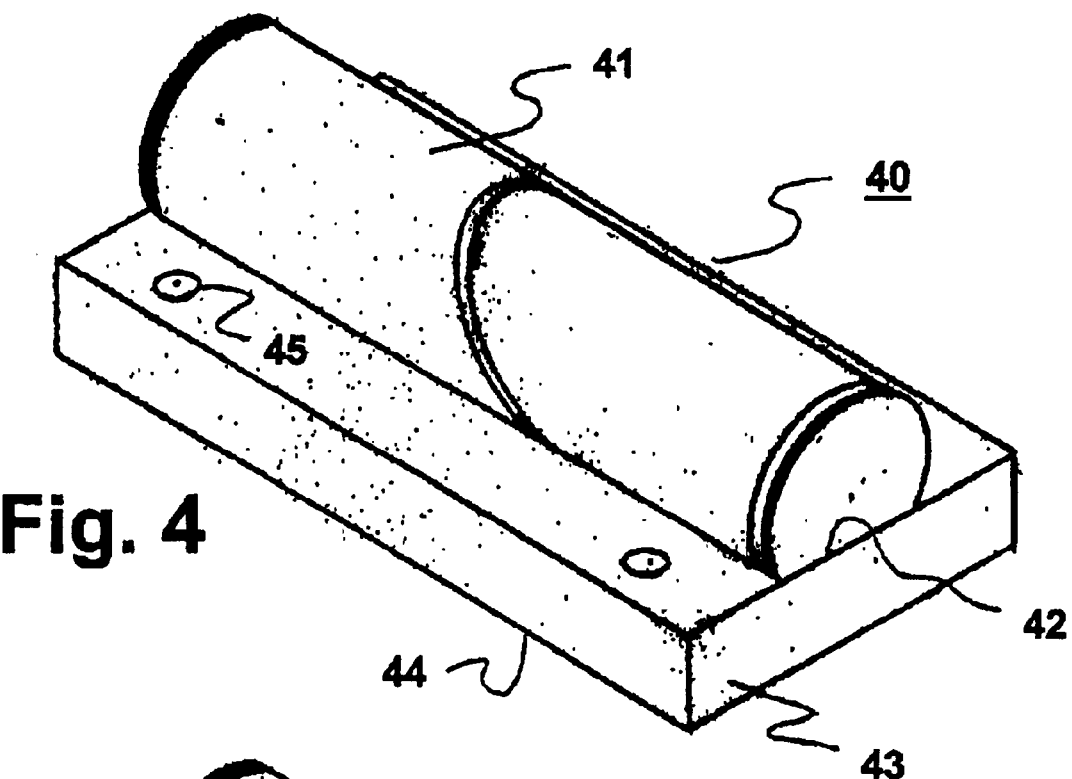
FIG. 4 shows a cavity assembly similar to that shown in FIGS. 1–3 wherein the rod has a small flat ground side bonded onto a broad flat upper face of a precisely ground temperature matched pallet.

FIG. 4 shows yet another embodiment of an assembly 40 wherein the laser rod 41 has a flat side 42 and this side is placed on a broad flat surface of a thin pallet 43. The optical axis of the rod is first aligned with the pallet edges and then the flat side is bonded to the pallet surface. The flat side of the rod and/or the broad surface may be coated with an adhesive, which functions as a lubricant during axial alignment before drying; e.g. an epoxy resin. Alternatively these same surfaces may be coated with a material that forms a diffusion bond between them, either directly or when heat and or radiation is applied. The rod is then clamped until the bond is complete. Alignment can be accomplished manually using a straight flat edge face of the pallet or straight edged tools placed on the pallet. In production the straight edged tools may be a straight edged vise jaws, designed to precisely align and place the rod on the pallet. When the rod includes a polarizing element, as they must for use with some optical parametric oscillators, the flat side may used to establish the orientation of the polarization relative to the base pallet The pallet, preferably, has a broad flat bottom face 44 parallel to the upper face. The broad faces may match one another and the width of the rods, or they may be wider and drilled with mounting holes 45, grooves, or projections if desired. The pallet must have the same thermal expansion as the rod. A convenient solution to this problem is to use a slightly imperfect portion of the boule from which the rod is made, i.e. a portion not suitable for a laser rod. This provides matching crystal lattices that can be diffusion bonded for even greater durability and reliability.

Figure 5:
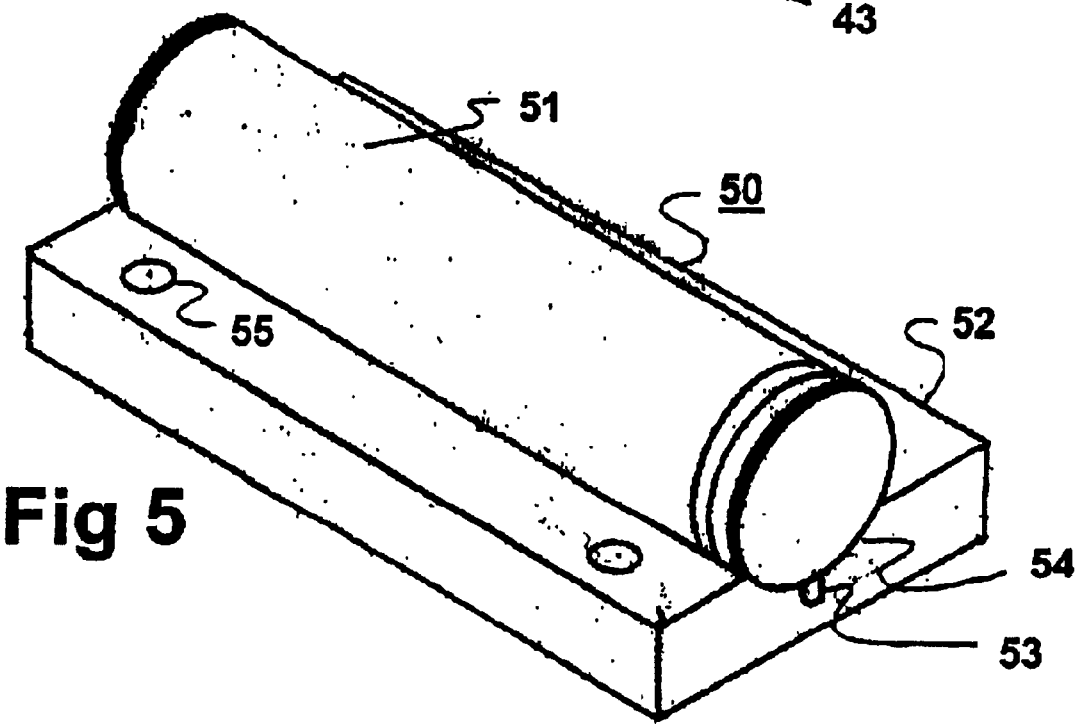
FIG. 5 shows a cavity assembly similar to those shown in FIGS. 1–3 wherein the rod is mounted in a small mating circular groove on a broad flat upper face of the precisely ground temperature matched pallet.

FIG. 5 shows yet another embodiment of an assembly 50 wherein the laser rod 51 has a circular cross-section. When combined with a linear polarizer the rod may fitted with a very small radial projection or pin, not shown, preferably aligned with the electric polarization vector. The pallet 52 has a circularly cylindrical main groove 54 to align the rod axis with its bottom and edge surfaces., and the main pallet groove may be provided with a fine groove 53, matching the cross-section of the projection. A simpler way to align a round rod with a Brewster notch is to align the bottom of the notch with the top surface of the pallet. Using a main groove of least cross-section makes it easier to manipulate the rod and conserves the material used for the pallet. Mounting holes, like hole 55, or other features can be added to mount the assembly, as previously stated.

The pseudo-monolithic design applies to gain materials and laser resonator designs other than that shown here. For instance, Nd:YVO4 is a well-known material that has been considered as an alternate to Nd:YAG for the laser rod. Nd:YVO4 has the advantage of producing a linear polarized beam without a Brewster notch. However, applicants did not elect to use Nd:YVO4 in their experiments due to several negative factors, namely that it is more expensive than Nd:YAG, softer and therefore harder to machine, and has a thermal mismatch to the Cr(4+):YAG passive q-switch.

The advantage of the monolithic approach lies in the reduced number of optical components required to achieve the same function. This results in lower system cost, less complexity, and eliminates the need to periodically realign the separate optical components, which make up the resonator in the standard configuration. The curved design of the HR and/or OC mirrors can improve output beam quality and reduce manufacturing alignment tolerance requirements. In addition, the coating on the output coupling mirror could be designed to have a radially graded reflectance at the output wavelength to produce a desired beam profile and beam quality.

The method for manufacture of the above resonance cavity thus involves the steps of:

(A) machining a long rod of laser gain material having a uniform cross-section with a straight line optical axis centered therein, at least one sideface parallel to said axis within less than thirty and preferably less than ten seconds of arc as well as two end-faces selected from a group comprising flat end-faces normal to said axis within thirty, but preferably ten seconds of arc and convex spherical endfaces defined by spheres several meters in diameter centered on said optical axis having the same axial angular tolerances;

(B) machining at least one wafer from a group of materials that define Q-switches, polarizers and frequency filters for lasers, said wafer having the same cross-section with opposed parallel end-faces machined to the same dimensional tolerances as said rod, one end-face of which mates with one end-face of said rod;

(C) aligning and permanently bonding said one end-face of said wafer to said one end-face of said rod; and (D) coating the exposed endfaces of said rod and said wafer with a dielectric or metal mirror that efficiently reflects radiation at the desired lasing wavelength.

The method may also further include the sub steps of:

(B$_1$) repeating step B to provide different members of said wafer group; and (B$_2$) aligning and permanently bonding mating end-faces of said wafers to form one composite wafer from all said wafers before performing step D.

The method can also includie the step of:

(A$_1$) machining a notch part way through said rod at Brewster's angle to said axis, the notch being less than a millimeter wide with sides flat and parallel to the same axial angular tolerances as the normal end-faces of said rod.

The method may also include the steps of:

(E) machining a thin pallet from a material having the same coefficient of thermal expansion as said gain material, said pallet defining narrow edge surfaces a broad flat bottom surface and a broad top surface including a portion of said top surface that mates with said side surface to align said rod axis parallel to said bottom surface; and (F) bonding the mating surfaces of said rod and pallet.

Finally the method may including the step of:

(E$_1$) further machining said narrow edge-faces of the pallet to engage the reflector cover of said flash lamp and/or a support member in a laser range finder.

While this invention has been described in terms of preferred embodiment consisting of a one piece assembly made from a number of critically arranged elements, those skilled in the art will recognize the true scope of the invention as defined in the claims which follow.

Having thus described our invention, what we claim as new and desire to secure by Letters Patent is as follows:

1. A small high power pulsed laser subassembly for use with a gas discharge or similar high power pump means for emitting photons at a first wavelength; comprising:

a long rod of laser gain material with a longitudinal optical axis which lases in response to said pump photons emitting photons of a second wavelength, said rod having a small uniform cross-section smaller than its length, at least one side surface parallel within less than thirty arc seconds to said axis and two end-faces, chosen from a group comprising flat end-faces and convex endfaces defined by spheres greater than one meter in diameter centered on said optical axis, said end-faces being centered normally within a less than thirty arc seconds to said optical axis, said rod being formed with a notch for polarizing said photons of said second wavelength, said notch located between said end-faces and extending partially therethrough;

a highly reflective mirror coated on a first of said two end-faces that reflects substantially all of said beam photons impinging thereon toward the second of said two end-faces, a first thin wafer of material, that acts as a Q-switch, with third and fourth parallel end-faces having the same cross-section and axial angular tolerances as said other end-faces, said third end-face being bonded to said second end-face; and, an output coupling mirror coated on said fourth end-face, which passes a small percentage of the photons of said second wavelength reflecting the remainder toward said first end-face.

2. A small high power pulsed laser subassembly according to claim 1, further including:

a second thin layer of material, that acts as a polarizer for said second wavelength bonded to said first thin wafer, said second layer being bonded to said second end-face.

3. A small high power pulsed laser subassembly according to claim 1, further including:

a third thin layer of material, that acts as a band pass filter for said second wavelength bonded to said first thin layer, said third layer being bonded to said second end-face.

4. A small high power pulsed laser subassembly according to claim 2, further including:

a third thin layer of material, that acts as a band pass filter for said second wavelength bonded to said first and second thin layers, said third layer being bonded to said second end-face.

5. A method for the manufacture of a resonance cavity used with a high intensity reflector covered flash lamp type of optical pump; comprising the steps of:

(A) forming a long rod of laser gain material to have a uniform cross-section with a straight line optical axis centered therein, at least one sideface parallel to said axis within thirty seconds of arc and two endfaces selected from a group comprising flat end-faces and convex spherical endfaces defined by a sphere greater than two meters in diameter centered on said optical axis said end-faces being centered normal to said axis within 30 seconds of arc;

(A1) establishing a transverse notch in said long rod for polarizing a laser output of said long rod, said notch located between said endfaces and extending partially through said long rod;

(B) forming at least one wafer from a group of materials that define Q-switches, polarizers and frequency filters for lasers, said wafer having the same cross-section with opposed parallel end-faces machined to the same dimensional tolerances as said rod, one end-face of said wafer mating with one end-face of said rod;

(C) aligning and permanently bonding said one end-face of said wafer to said one end-face of said rod; and, (D) coating the exposed end-faces of said rod and said wafer with a mirror that efficiently reflects radiation of said lasing wavelength.

6. A method according to claim 5, further including the steps of:

($B_1$) repeating step B to provide different members of said wafer group; and, ($B_2$) aligning and permanently bonding mating end-faces of said wafers to form one composite wafer from all said wafers before performing step D.

7. A method according to claim 5 wherein said step A1 is accomplished so that said notch is oriented at Brewster's angle to said optical axis.

8. A method according to claim 7 wherein said notch has a predetermined width and establishes opposing flat faces that are parallel to each other.

9. A method according to claim 5, further including the step of:

(E) providing a thin pallet from a material having the same coefficient of thermal expansion as said gain material, said pallet defining narrow edge surfaces a broad flat bottom surface and a broad top surface including a portion of said top surface that mates with said side surface to align said rod axis parallel to said bottom surface; and (F) bonding the mating surfaces of said rod and pallet.

10. A method according to claim 9, further including the step of:

(E1) engaging said narrow edge surfaces with the reflector cover of said flash lamp.

* * * * *